United States Patent [19]
> Coleman, et al.

[11] 3,774,216
[45] Nov. 20, 1973

[54] DIRECTION FINDER
[75] Inventors: Fred J. Coleman, Jr., North Syracuse; Richard C. Weischedel, Camillus, both of N.Y.
[73] Assignee: General Electric Company, Syracuse, N.Y.
[22] Filed: June 30, 1971
[21] Appl. No.: 158,483

[52] U.S. Cl. ..................................... 343/119
[51] Int. Cl. ..................................... G01s 3/30
[58] Field of Search ........................... 343/119

[56] References Cited
UNITED STATES PATENTS
2,992,428  7/1961  White .......................... 343/119
3,344,430  9/1967  Hildebrand .................. 343/119 X
3,496,565  2/1970  Jenkins ........................ 343/119

Primary Examiner—T. H. Tubbesing
Attorney—Carl W. Baker, et al.

[57] ABSTRACT

A direction finder for determining the azimuthal location of a source of electromagnetic wave energy such as the electromagnetic pulse resulting from a nuclear detonation or lightning stroke. Such determination is accomplished using a pair of orthogonally related directional antennas together with digitally implemented signal processing means which derive from the received signals measures of their relative phases and amplitudes and generate therefrom an ambiguity-free measure of the azimuthal angle of the electromagnetic pulse source.

10 Claims, 5 Drawing Figures

PATENTED NOV 20 1973    3,774,216
SHEET 1 OF 4
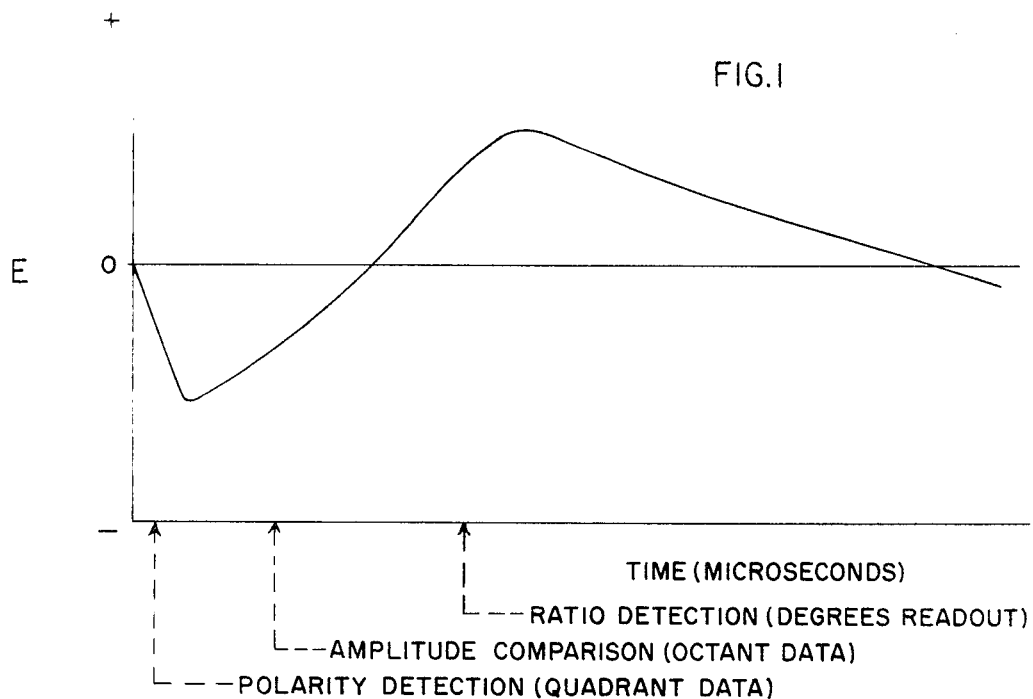
FIG.1
E
TIME (MICROSECONDS)
└── RATIO DETECTION (DEGREES READOUT)
└── AMPLITUDE COMPARISON (OCTANT DATA)
└── POLARITY DETECTION (QUADRANT DATA)
TRUTH TABLE FOR PRESETTING UP-DOWN COUNTERS
| OCTANT FROM | SECTOR TO | X>0 1 | Y>0 2 | (X)>(Y) 3 | COUNT UP=1 DOWN=0 | COUNT FROM | TENS D' 8 | C' 4 | B' 2 | A' 1 | UNITS D° 8 | C° 4 | B° 2 | A° 1 |
|---|---|---|---|---|---|---|---|---|---|---|---|---|---|---|
| 0 | 45 | 1 | 1 | 0 | 1 | 0 | 0 | 0 | 0 | 0 | 0 | 0 | 0 | 0 |
| 45 | 90 | 1 | 1 | 1 | 0 | 90 | 0 | 0 | 0 | 1 | 1 | 0 | 0 | 0 |
| 90 | 135 | 1 | 0 | 1 | 1 | 90 | 0 | 0 | 0 | 1 | 1 | 0 | 0 | 0 |
| 135 | 180 | 1 | 0 | 0 | 0 | 180 | 0 | 0 | 1 | 1 | 0 | 1 | 1 | 0 |
| 180 | 225 | 0 | 0 | 0 | 1 | 180 | 0 | 0 | 1 | 1 | 0 | 1 | 1 | 0 |
| 225 | 270 | 0 | 0 | 1 | 0 | 270 | 0 | 1 | 0 | 1 | 0 | 1 | 0 | 0 |
| 270 | 315 | 0 | 1 | 1 | 1 | 270 | 0 | 1 | 0 | 1 | 0 | 1 | 0 | 0 |
| 315 | 360 | 0 | 1 | 0 | 0 | 360 | 0 | 1 | 1 | 1 | 0 | 0 | 1 | 0 |
FIG.6
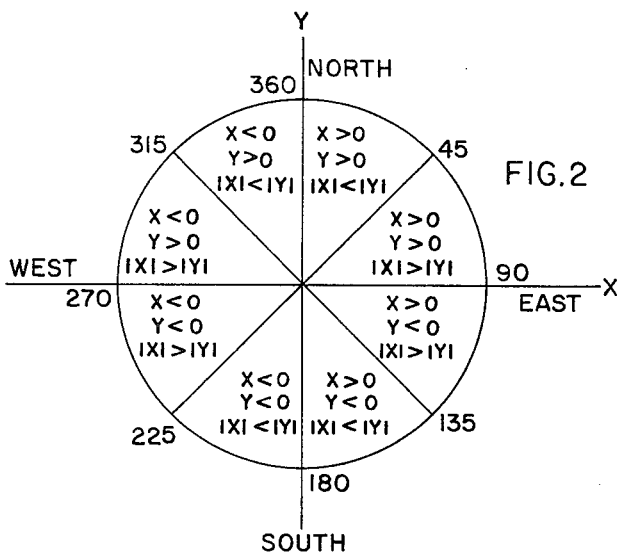
FIG.2
INVENTORS
FRED J. COLEMAN, JR.
RICHARD C. WEISCHEDEL,
BY *Carl W. Baker*
THEIR ATTORNEY.

DIRECTION FINDER

This invention relates generally to direction finders and more specifically to such finders capable of determining the azimuthal location of an electromagnetic wave energy source by measurement of phase and amplitude characteristics of signals received from the source. While useful also for locating other electromagnetic energy sources such as lightning strokes, the direction finder of the invention affords particular advantage as applied to location of nuclear events by sensing the electromagnetic pulses which accompany them and deriving azimuthal measurements from the pulse characteristics sensed.

The waveform, frequency and other characteristics of the electromagnetic pulse which accompanies a nuclear detonation has been treated at length in the literature, as for example in the paper by Johler and Morgenstern, entitled "Propagation of the Ground Wave Electromagnetic Signal, With Particular Reference to a Pulse of Nuclear Origin", published in the December 1965 IEEE Proceedings, Vol. 53, No. 12, Pgs. 2043–2053. As will be apparent from the description of the ground wave electromagnetic signal given in this and other references, its use for source location is difficult of accomplishment using conventional radio direction finding equipment. Principal among the difficulties involved are the very short duration of the pulse, which is much too brief to permit any operator manipulation of receiving antenna orientation during the time of reception of the pulse, as is required by many conventional radio direction finders, and the extreme dynamic range of the pulse which makes it very difficult to obtain meaningful measures of pulse amplitudes and waveform characteristics as needed for azimuthal angle determinations.

While the currently most commonly used radio direction finders require operator manipulation of loop antennas or other directional wave sensors, the prior art includes a number of direction finder systems capable of deriving azimuthal angle measurements without such manipulation; the systems described in U.S. Pat. Nos. 3,344,430 to Hildebrand and 3,490,024 to Sherrill et al are representative of known systems of this type. Another such system employs crossed loop antennas with each loop controlling the deflection drive of a cathode ray tube display in one of its two orthogonally related coordinates, and in some systems of this kind there is provision for resolving the 180° ambiguity which otherwise exists by intensity modulating the CRT in accordance with the signal received by an associated omnidirectional antenna.

When used for source location in nuclear event detection systems, crossed loop direction finders of this general kind have encountered serious difficulties in the problem areas previously mentioned, particularly in resolving the 180° ambiguity in azimuth even with aid of an omnidirectional sensor input, and in accomodating the extreme dynamic range of the signals received. The several known approaches to this latter problem have not proven entirely satisfactory. As generally practiced, for example, logging techniques require close matching of diodes and precise temperature control, and because conventional signal normalization techniques require time before the normalization can become effective they require delay elements and more complex circuitry to introduce this time delay and factor it into control of signal processing operations.

The present invention relates to direction finders of the general class just described, and has as its primary objective the provision of such direction finders affording significant performance advantages particularly as applied in nuclear detection equipments for determining the azimuthal location of a nuclear event. As will become apparent as the description of the invention proceeds, it affords such desired characteristics as the capability to determine azimuth location of a pulse source radiating only an extremely short duration pulse, the ability to accommodate an extremely wide dynamic range of pulse amplitudes, and the ability to provide a substantially instantaneous readout of azimuth angle free of an ambiguities and wih a degree of accuracy which may achieve relatively high levels without undue complication of the system circuitry. In its preferred embodiment the system circuitry is implemented in digital form facilitating the achievement of relatively high resolution of azimuth angle by additional paralleling of certain components which are relatively simple in circuitry and relatively low in cost.

It is accordingly an object of this invention to provide a direction finder capable of providing substantially instantaneous indication of the azimuthal location of an electromagnetic wave energy source, with no manipulation or other operator input required to obtain an ambiguity-free indication of source azimuthal angle. It is also an object of the invention to provide such direction finder capable of deriving the azimuthal angle determination with an electromagnetic energy pulse of extremely short duration and of extremely wide dynamic range, thus adapting the direction finder to use in nuclear event locating applications. Still another object of the invention is the provision of a direction finder of this kind which is digitally implemented so as to enable direct output of the measured azimuthal angle in digital form, and to enable achievement of desired degree of accuracy of the azmithal angle measurement without undue complexity or cost of required circuitry for its implementation.

SUMMARY OF THE INVENTION

In its preferred embodiment as hereinafter described, the direction finder of this invention employs a pair of directional receptors which conveniently may take the form of loop antennas arranged in orthogonally related orientation such that their respective directions of senstivity are along mutually perpendicular axes which for convenience may be termed the X and Y axes. Preferably a third receptor of omnidirectional sensitivity characteristic, such as provided by simple dipole or whip antenna, is included to provide a nondirectional amplitude signal which is used for signal normalization and thresholding, and where necessary also for resolving any 180° ambiguity in direction indication. Each of the X and Y channel signals is coupled through a normalizer which attenuates both signals identically in two or more discrete steps in response to a normalization control input which is derived from the nondirectional amplitude signal, to thus maintain the X and Y channel signals at manageable and identically matched attenuation levels through their respective processors.

After normalization of the X and Y channel signals, the polarity of each of these signals is sensed and their polarities transmitted to selector means, which derives therefrom the quadrant in which the source is located. The X and Y channel signals are applied to absolute value circuits so that both signals have the same polarities. An amplitude comparison of the [X] and [Y] signals then is made and its result transmitted to the selector means, which determines from this input which of the two octants in the previously selected quadrant the source lies in. Finally, the [X] and [Y] channel signals are ratioed to derive a measure of the angular position of the source within the octant thus selected, this preferably being accomplished by digital counter means which are set by the octant selector to a count corresponding to the identified octant and which then counts up or down from this preset count in accordance with the ratio of the two signals.

When the counter has completed this operation it will have stored a number representative of the azimuthal angle to the point of origin of the electromagnetic wave energy sensed. This information can be shifted into permanent storage or shown on suitable display means as preferred.

BRIEF DESCRIPTION OF THE DRAWINGS

The invention will be further understood and its various objects, features and advantages more fully appreciated by reference to the appended claims and to the following detailed description when read in conjunction with the accompanying drawings, wherein:

FIG. 1 is a plot of EMP wave amplitude against time, for a nuclear event of representative magnitude and distance from the point of measurement.

FIG. 2 is a compass rose illustrating the basis on which octant selection is made by the direction finder of FIG. 3.

FIG. 6 is a truth table illustrating the operation of the octant selector in presetting the up-down counters in FIG. 5.

DESCRIPTION OF THE PREFERRED EMBODIMENT

FIG. 1, which is based on the EMP ground wave data contained in the Johler-Morgenstern paper referenced above, illustrates a typical electromagnetic pulse waveform at approximately 50 miles from the point of detonation of the nuclear device from which radiation derives. As shown, the waveform goes initially sharply negative, then reverses polarity, becomes positive, and slopes relatively slowly toward a second crossing of the zero axis. The entire waveform through its two zero crossings requires only a time period of less than 100 microseconds as reported in the Johler-Morgenstern paper, at this approximate 50 mile distance from its point of origin.

While the time duration of the wave is dependent on the distance from the source to the point at which it is to be observed, at distances within the range of interest here the time duration of the pulse would always by too brief to enable direction finding using conventional single loop equipments requiring operator manipulation. In accordance with the invention, direction finding is accomplished without operator manipulation or other adjustment of sensor elements, and is completed within the relatively very brief period of a typical nuclear EMP waveform.

Figure 3:
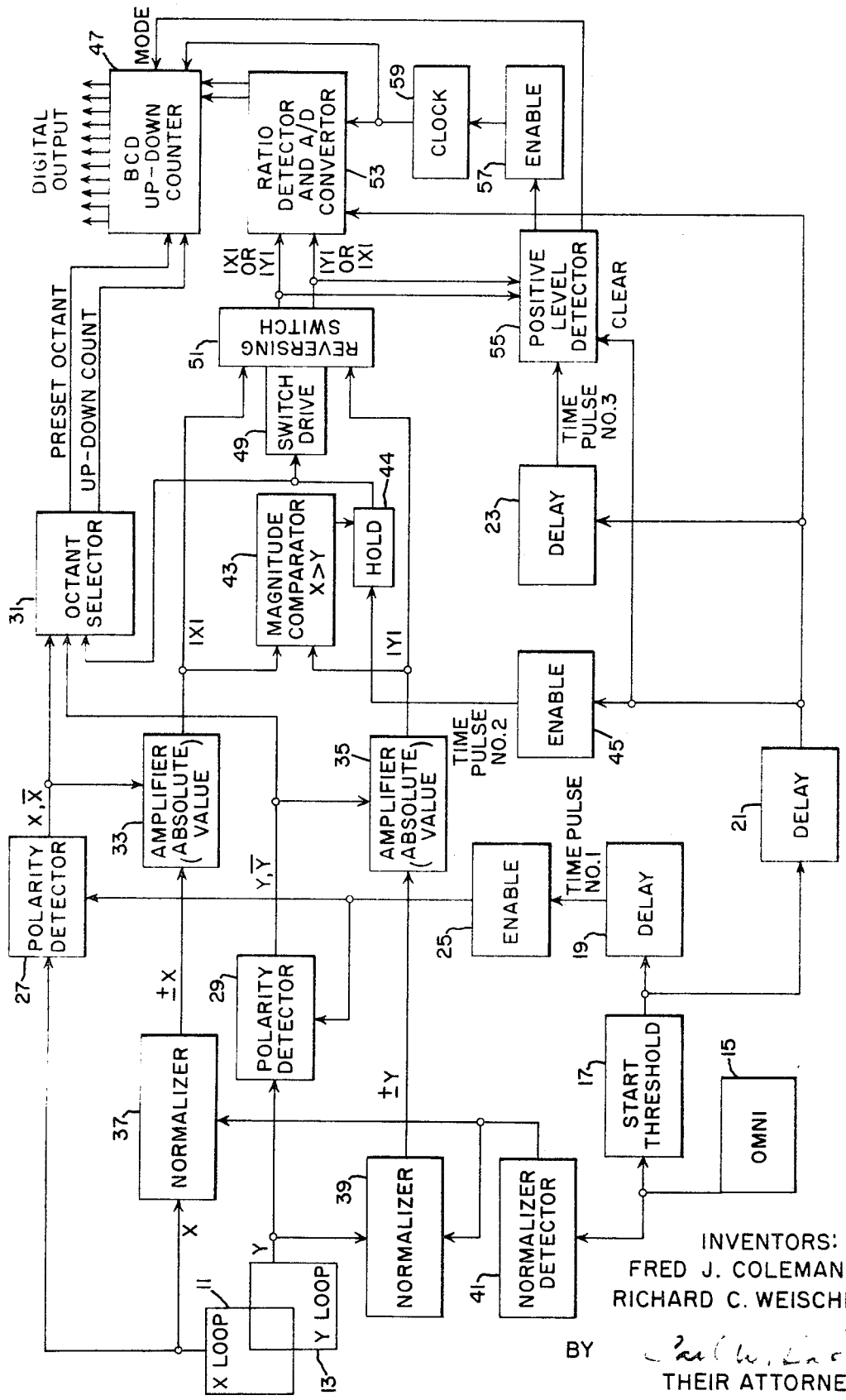
FIG. 3 is a block diagram of a direction finder system in accordance with the invention.

To accomplish this the system of this invention comprises a pair of identical loop antennas as shown at 11 and 13 in FIG. 3, the two loops having orthogonally related polarizations or sensitivity patterns which are respectively oriented in X and Y directions, where the Y direction is defined as North-South and the X direction as East-West in the particular embodiment being described. It can readily be shown that the Y loop will give an output which is proportional to the cosine of the azimuth angle to a source of electromagnetic radiation incident upon the two loops, in accordance with the relation:

$E_Y = E_{Max} \cos \theta$ Since the X loop is oriented at right angles to the 0° reference, it gives an output which is proportional to the sine of the azimuth angle, that is, $$E_X = E_{Max} \sin \theta$$

The effect thus is to resolve a received signal into its X and Y components, yielding sufficient information to determine the azimuth of the received signal. However, use of the signal amplitudes alone is not sufficient to determine the azimuthal angle without ambiguity; the polarities or relative phases of the signal voltages must also be factored into the angle determination to resolve ambiguities otherwise present.

This can perhaps most easily be understood by reference to the compass rose of FIG. 2. As will be obvious from inspection of FIG. 2, there exists within each octant of the compass rose a unique combination of X and Y signal polarities and of the relative magnitudes of absolute values of the X and Y signals. Thus in the first octant, from 0° to 45°, the X and Y signals both are positive and the absolute magnitude of the Y signal exceeds that of the X; in the second octant, from 45° to 90°, the X and Y signal polarities again are both positive but the absolute value of the X signal now exceeds that of the Y. Further, since the ratio of these absolute magnitude signals varies across each octant, measurement of this signal ratio enables a fine measurement of the angular position of the source within the octant. In the first octant, for example, the ratio of the Y signal absolute value to that of the X varies from zero at 0° azimuth to unity at 45°; the source location accordingly is fixed within this octant as the angle whose tangent is equal to the value of this ratio.

From FIG. 2 it is apparent that azimuth angle could be determined first by identifying the quadrant in which the source lies by sensing the polarities of the two loop signals, then fixing the azimuth angle within that quadrant by ratioing the absolute magnitudes of the two loop signals. Such technique is difficult to implement, however, because whichever of the two signals is divided into the other to obtain their ratio will, at one extreme of the quadrant, approach zero which of course will cause the ratio to approach infinity. The processing of such undefined ratios, particularly in digital implementations, is complex and difficult.

To avoid this, the direction finder of this invention uses a combination of polarity sensing and magnitude comparison to identify the octant in which the source lies, then fixes the angle within that octant by ratioing the loop output signals. Since the angle over which ratioing need be accomplished is only the 45° angle of the preselected octant, it is possible by proper control of the signal ratioing means to assure that the smaller of the two signals always is in the numerator position, thus assuring that their ratio always will fall between zero and unity. Ratios within this range may readily be processed as necessary to determine azimuth angle within the preselected octant.

The receptor or antenna loops preferably are of dimensions small as compared to the EMP signal wavelengths, which span a relatively wide band corresponding to the frequency band from about 10 Hz to perhaps 150 KHz, peaking at approximately 12 KHz. The magnitude of the antenna loop current then will be proportional to the sensed signal amplitude and to the effective area enclosed by the loop, i.e., its enclosed area as projected onto the plane perpendicular to the direction of the propagating signal.

If, as in the nuclear event detection application, it is known what the polarity of the initial half cycle of the observed waveform will be, then the polarities of the X and Y loop signals may be determined with no ambiguity without need for any additional "sense" input. However, where the observed waveform may initially be of either polarity, an ambiguity will exist and to resolve such ambiguity a third receptor, omnidirectional in sensitivity pattern, may be provided as indicated at 15. Even in the absence of need for a nondirectional input for the purpose of resolving such ambiguity, the omni desirably is included as it serves additional purposes as will be explained.

Among these additional purposes is the control of timing of the polarity detection, magnitude comparison and ratioing operations. Such control is effected through a start threshold element 17 and delay elements 19, 21 and 23, which respectively time certain of the operations of the system. Start threshold 17 preferably is set so as to output its START signal whenever the input signal sensed by the omni antenna 15 substantially exceeds the noise; typically this threshold will be reached within a few microseconds after the start of the EMP pulse waveform. The START signal, delayed at 19 by a few microseconds as indicated, becomes Time Pulse No. 1 and triggers an "enable" element 25 which actuates polarity detection means 27 and 29 included in the X and Y signal processing channels respectively. The X and Y polarity signals thus derived are transmitted to an octant selector 31 and also to X and Y absolute value amplifiers 33 and 35, respectively.

The X and Y signal inputs to these absolute value amplifiers are transmitted through normalizers in he X and Y channels respectively designated 37 and 39. These normalizers operate under control of a normalization signal derived by the normalizer-detector 41 from the nondirectional amplitude signal sensed by the omni antenna 15, and serve as a pair of matched variable attenuators which are simultaneously adjusted in response to the normalization signal to attenuate both X and Y signals identically. More specifically, and as more fully detailed hereinafter, normalizers 37 and 39 may comprises an identical pair of resistance networks with electronic switching means providing common control of both in response to the normalization signal, so as to output normalized X and Y signals each representing an identical fraction of the input, of value selected to hold the larger of the two signals within predetermined dynamic range limits.

The signal output from each of the normalizers 37 and 39 is amplified in the corresponding absolute value amplifier 33 or 35 and applied to a magnitude comparator 43 which determines whether the [X] or [Y] signal has the greater amplitude, and outputs a signal accordingly to a "hold" circuit 44. This circuit when energized by Time Pulse No. 2, which is applied to it through an "enable" circuit 45 in response to the START signal as delayed at 21 by about 10 microseconds as indicated, senses and holds the magnitude comparator output through the duration of the operating cycle. The signal thus held is applied as a logic $X > Y$ or $\overline{X > Y}$ signal to the octant selector 31 and, with its other inputs, causes the selector to output PRESET OCTANT and UP-DOWN COUNT control signals to a BCD up-down counter 47.

The octant identification and count up or count down decisions by octant selector 31 are made by examining the outputs of the two polarity detectors and of the magnitude comparator. If the input signal arrived at an azimuth an gle between 0° and 45°, for example, both X and Y signals will have a normal positive polarity and the absolute value of Y is greater than the absolute value of X. For this particular input, the BCD up-down counter will be preset to zero and the counter programmed to count up therefrom. As another example, if the input is between 45° and 90° the X and Y signals still will have positive polarity but here the absolute value of X will be greater than that of Y. The BCD up-down counter then will be reset to a count of 90, and the counter programmed to count down therefrom, i.e., downward from 90° towards 45°. These operations of the BCD up-down counter will be covered in greater detail later with reference to the truth table of FIG. 6, which illustrates its programming.

The switch drive 49 and reversing switch 51 operate in response to the $X > Y$ or $\overline{X > Y}$ signal from magnitude comparator 43 to connect whichever it has found to be the larger of the [X] and [Y] signals to one of the two inputs to a digital comparator 53, and to connect the smaller of the [X] and [Y] signals always to the other of the two comparator inputs. These X and Y channel signals also are applied to a positive level detector 55 which is triggered, when the mean value of the higher and lower inputs to the digital comparator exceeds a preset or threshold value, to energize an "enable" circuit 57. This in turn energizes a clock 59 initiating readout of the results of the digital comparison at 53 into the BCD up-down counter, and it applies also a mode control signal to the counter preparatory to such readout. Should the [X] and [Y] signals as applied to positive level detector 55 not reach this threshold value, the detector still will be triggered to initiate readout of the digital comparator into the counter by Time Pulse No. 3 which is inputted to detector 55 after delay at 21 and 23 for a time greater than one half-cycle of the waveform signal.

Upon completion of counter operation, the count then standing may be outputted to any convenient recording or display means, and represents the azimuthal angle of the source of the signal which triggered the START threshold and the ensuring direction finding process. It will be noted that all measurements necessary to the source direction determination are completed within one cycle of the waveform signal, thus enabling completion of the direction finding operation even with extremely short pulses such as illustrated in FIG. 1. As will also be noted from that figure, the system operates to derive the octant data, i.e., to detect signal polarities and to determine which of the X and Y signals has the greater amplitude, during the first or negative half-cycle of the waveform, and measures the ratio of the amplitudes of the two signals during the second half-cycle. This enables normalization of the signals to be completed before making any signal amplitude measurements, and allows sufficient time for transients to subside prior to signal ratioing for degrees measurement. Further, this timing sequence avoids the taking of measurements near the zero crossover point at which signal amplitudes are difficult to measure accurately and at which signal ratios may become indeterminate, and places the different signal sensing steps at points along the waveform at which they can most effectively be accomplished.

Figure 4:
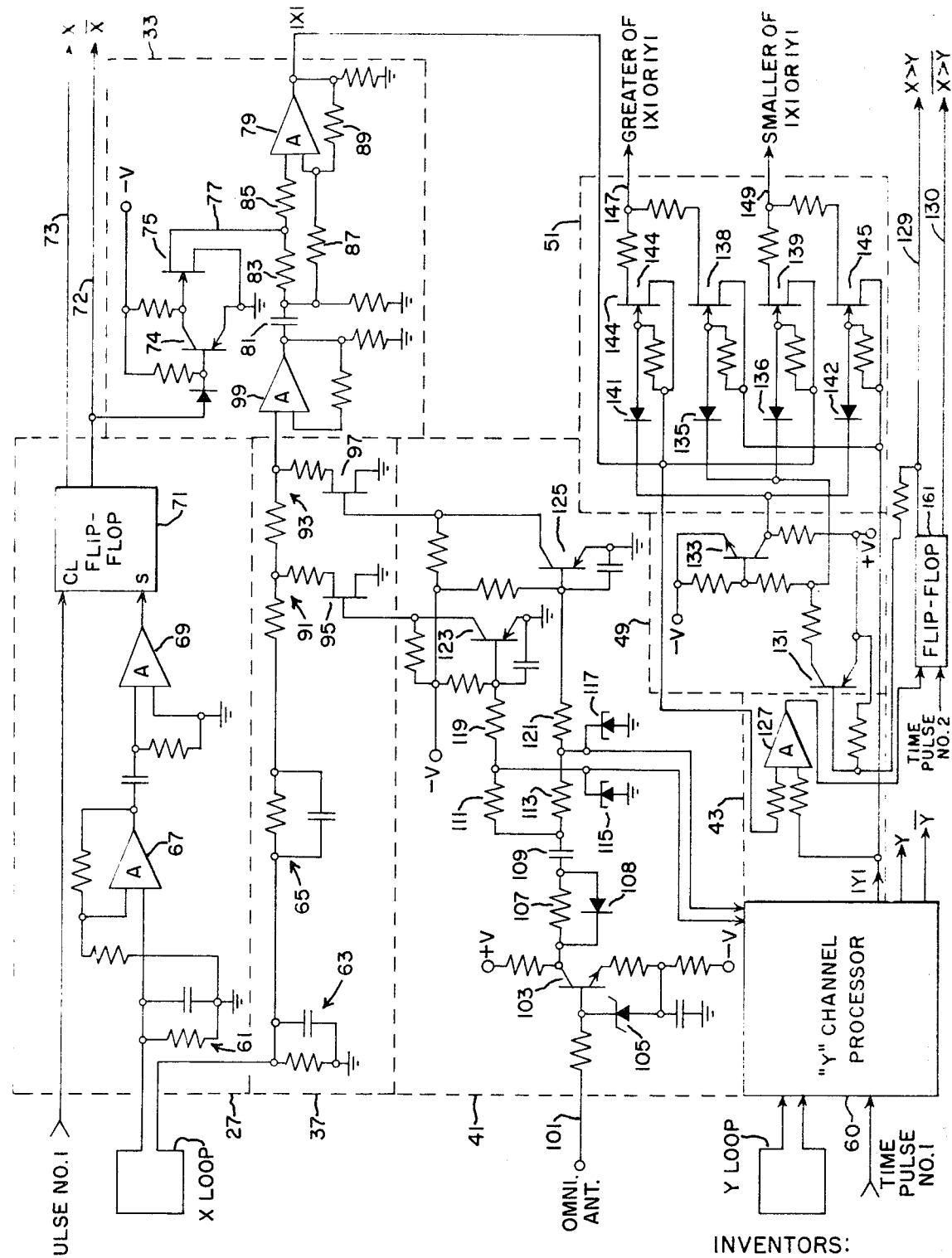
FIG. 4 is a schematic circuit diagram of certain subsystems of the direction finder system of FIG. 3.

With reference now to FIG. 4, the X channel signal processing circuitry, including the signal normalizer 37, the X signal polarity detector 27 and absolute value amplifier 33, are shown together with certain of the common or omni channel components including the normalizer detector 41, magnitude comparator 43, the reversing switch drive 49 and reversing switch 51. The Y channel signal processing circuitry is identical to that of the X channel, so in the interests of simplicity this Y channel circuitry is shown simply as a block 60 which will be understood to include the same components as now to be described with reference to the X channel processor.

The X channel antenna loop has its opposite ends connected to termination networks 61 and 63 which as shown comprise resistance and capacitance elements of values such as to properly load the antenna and provide the desired resonant frequency and bandwidth, and which form parts of the polarity detection and normalization circuits 27 and 37, respectively. The connections of these circuits to the antenna loop are such that for the first half cycle of quadrant 1 signals, the positive end of the loop is that connected to the normalization circuit 37 and the negative end of the loop, the signal on which will for convenience be termed the "inverted" signal, is connected to the polarity detection circuit 27.

In the polarity detector 27, the inverted X signal is amplified by a non-inverting amplifier 67 which conveniently may take the form of a dual sided operational amplifier enclosed in a negative feedback loop through a voltage divider which feeds back to its negative input a portion of its output, to thereby control amplifier gain. The amplified output is capacitor-coupled to the negative input of a second such operational amplifier 69 the positive input to which is connected to ground. This amplifier 69 accordingly will have an output which remains low when the inverted X signal is positive and which will be high when the inverted X signal is negative. The amplifier output is connected to the "set" input of a flip-flop 71 having as the input to its "clock" terminal Time Pulse No. 1, which it will be recalled occurs a few microseconds after the START signal.

If the input from amplifier 69 is high when Time Pulse No. 1 is received, the "1" terminal of the flip-flop will go high and the "0" terminal low. This denotes that the inverted X signal is negative and results in the output of a logic $\overline{X}$ signal on lead 72; were the X signal positive the "0" terminal would be high resulting in the output of a logic X signal on lead 73. The signals on these leads thus constitute a polarity indication, and are transmitted to the octant selector of FIG. 5 for utilization there in the manner to be described.

The $\overline{X}$ signal also is applied to the absolute value amplifier circuit 33, in which it is diode coupled to the base of a transistor 74. If the inverted X signal is negative for this first half cycle, the resulting $\overline{X}$ input to the transistor base electrode will switch the transistor off and its collector and the gate of an FET analog switch 75 connected thereto will go negative, substantially to the negative supply voltage (−V). Such negative gate voltage will turn the switch 75 off, thus isolating lead 77 from the ground connection otherwise provided through this switch. If the inverted X signal is negative, there will be no $\overline{X}$ input to transistor 73 and the transistor and FET analog switch 75 will remain on, effectively shunting lead 77 to ground through the switch.

The grounding of lead 77 controls the polarity of output of a dual sided operational amplifier 79, which is arranged to provide a positive output for the first half-cycle of the X signal, that is the half cycle before zero crossing, and a negative signal for the second half cycle. To accomplish this, the amplifier input, through capacitor 81, is coupled to one of the two amplifier inputs through two series connected resistors 83 and 85, both of approximately the same resistance value which is selected to be relatively high as compared to the internal resistance of the FET analog switch 75. Then when the transistor conducts and lead 77 is grounded therethrough, the input terminal of the amplifier 79 to which these resistors connect effectively is grounded. Under these conditions the input through resistor 87 to the other input terminal of amplifier 79, and its voltage feedback through resistor 89, will cause the amplifier to function as an inverting amplifier providing a positive signal output for a negative signal input. When lead 77 is isolated from ground by switch 75, both input terminals of amplifier 79 then are effectively tied to the same potential, the amplifier input impedance being much greater than that of resistors 83 and 87, and the amplifier accordingly will function as a voltage follower providing an output of the same polarity as its input.

The input signal to operational amplifier 79 is the X channel signal taken from the positive end of the X antenna loop and coupled through a phase control network 65 comprising parallel connected resistance and capacitance elements providing a phase shift (lag) of approximately two microseconds on higher frequency signals, this being for the purpose of enabling response to such higher frequency signal components notwithstanding the several microsecond delay introduced in the polarity and amplitude sensing of the signal. Filter network 65 is followed by a normalizer including two attenuation networks 91 and 93 each of which comprises a pair of resistors connected in voltage divider relation, with the divider circuit being completed to ground through one of two FET switches 95 and 97. Operation of these switches is controlled by the normalization signals derived from the omni antenna signal amplitude for dynamic range limiting as will be explained. The values of resistance in divider network 91 are chosen to divide the signal by a first ratio such as five to one when the FET transistor switch 95 is on; the values of resistance in divider network 93 are chosen to provide a second and higher attenuation ratio such as 25 to one when the FET transistor switch 97 also is on.

An operational amplifier 99 couples the X channel signal after amplitude control by the attenuation networks 91 and 93 to the absolute value amplifier at 79.

Amplifier 99 is a high input impedance noninverting amplifier with gain control provided by adjustment of the negative feedback ratio, for purposes of matching amplifier gains as between the X and Y signal channels.

Referring now to the normalization detector circuit 41 which supplies range switch control signals to the FET switches 95 and 97, the omni antenna input at 101 is coupled to he base of a transistor amplifier 103 and to a zener diode 105 connected to limit transistor base signal amplitude at a level selected to be sufficiently high for control of the range switching circuitry but not so high as to permit damage to circuit components due to excessive current levels therein. The output signal on the transistor collector is coupled through a resistor 107 which is bypassed by diode 108 and capacitor 109 to a pair of resistors 111 and 113 which respectively connect through tunnel diodes 115 and 117 to ground, and through resistors 119 and 121 to the base electrodes of transistors 123 and 125. The value of resistance element 113, for the approximately 5 to 1 difference of input voltages at which the low and high range switches 95 and 97 are respectively to be brought into operation, should be approximately five times that of resistance element 111; for example, resistance values of 3,300 ohms for resistor 113 and 750 ohms for resistor 111 would be suitable. Resistors 119 and 121 are for the purpose of providing bias for transistors 123 and 125, respectively, and may be of equal value typically of the order of 1,000 ohms.

In the absence of signal input at terminal 101, both of the tunnel diodes 115 and 117 will be off and transistors 123 and 125 also will be biased to their off state. When signal is received at terminal 101, the collector of transistor 103 will go negative and, depending on the amplitude of the received signal, either or both of the tunnel diodes 115 and 117 will switch on. This will establish a current flow through the tunnel diode, the associated resistor 111 or 113, capacitor 109, diode 108 and transistor 103. The voltage across the tunnel diode 115 will increase from the relatively low value which exists under quiescent conditions to a value sufficiently high to forward bias the transistor 123, turning it on and switching the associated FET transistor switch 95 also on. As the amplitude of the input signal further increases, tunnel diode 117 next will switch on and, in similar manner, cause transistor 125 to switch on energizing the second range switch 97. Zener diode 105 limits the maximum swing of the collector voltage of transistor 103, thus limiting the maximum current through tunnel diodes 115 and 117 so as to prevent possible damage thereto.

The X and Y channel signals, after normalization and amplification in their respective absolute value amplifiers, are applied to the inputs of a dual sided operational amplifier 127 which constitutes the principal component of magnitude comparator 43. When the absolute value X signal (the [X] signal in FIG. 4) is more positive than the [Y] signal, the output of amplifier 127 will be high and when the converse relationship exists and the [Y] signal is the larger the amplifier output will be low. The comparator output is sensed by a hold circuit comprising a flip-flop 161 which, when enabled by Time Pulse No. 2 to its "clock" input, will output either a logic X > Y or $\overline{X > Y}$ signal depending upon whether the output from amplifier 127 is then high or low. This logic signal is held through the remainder of the operating cycle irrespective of later change in the output of amplifier 127.

Figure 5:
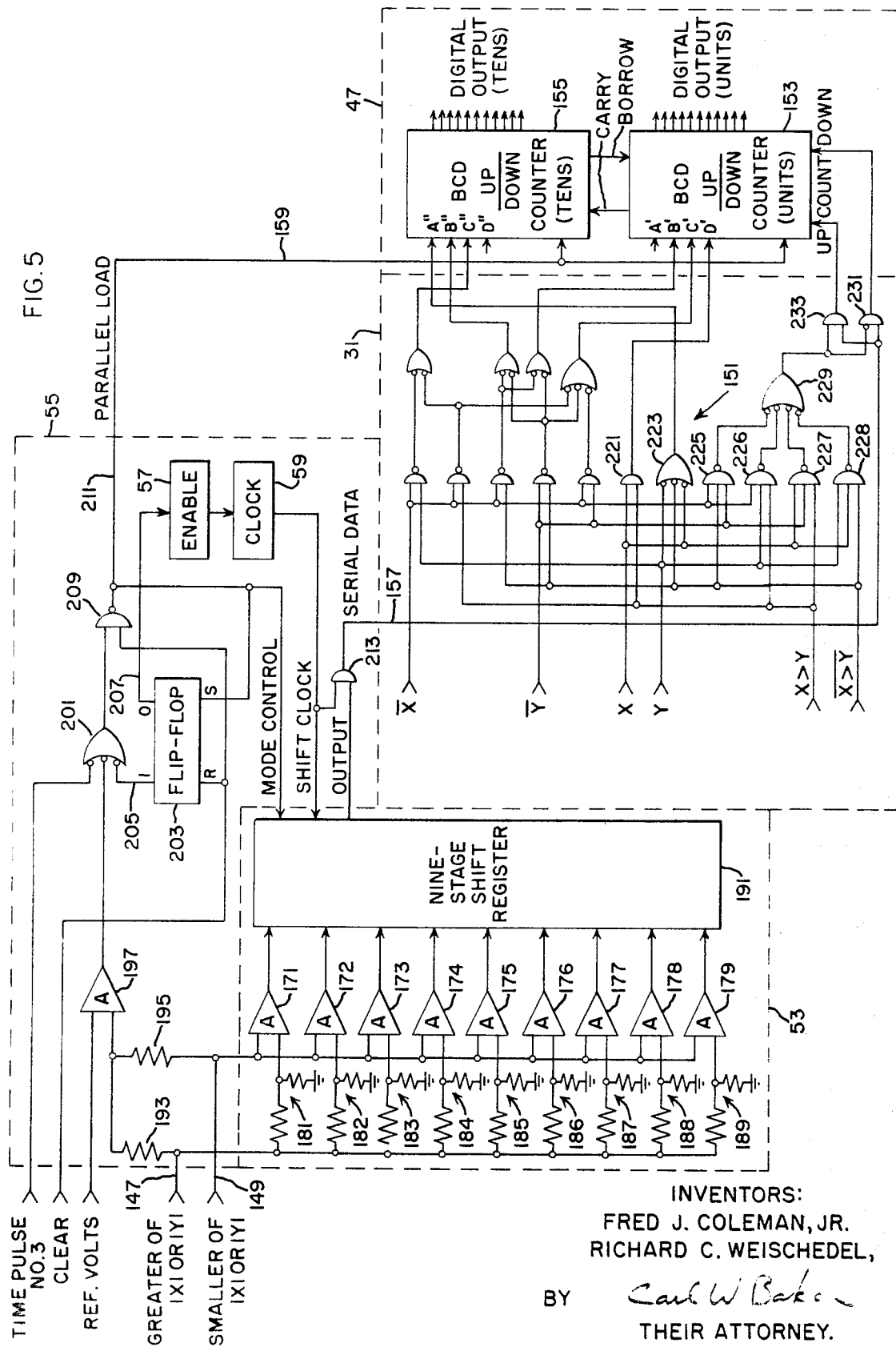
FIG. 5 is a schematic circuit diagram of certain other subsystems of the direction finder of FIG. 3.

The logic X > Y and $\overline{X > Y}$ signals thus derived are coupled via leads 129 and 130 to the octant selector of FIG. 5 for use therein as later to be described, and the X > Y signal also is applied to the base electrode of a transistor 131 which forms part of the reversing switch drive circuit 49. When the X > Y signal is high this turns off transistor 131 causing the voltage at its collector to go negative, thus switching off a second transistor 133 to the base electrode of which this collector signal from transistor 131 is coupled. The collector voltage of transistor 133 then rises to the positive supply voltage.

The collector voltage of transistor 131 is applied through diodes 135 and 136 to the gate electrodes of a pair of FET transistor switches 138 and 139, respectively, and the collector voltage of transistor 133 is similarly applied through diodes 141 and 142 to the gate electrodes of FET transistor switches 144 and 145, respectively. The arrangement is such that when the logic X > Y signal is high, transistor 131 switches off and holds FET transistor switches 138 and 139 open so that no Y signal circuit is completed through switch 138 and no X signal circuit is completed through switch 139. When transistor 131 switches off transistor 133 follows, and its positive-going collector voltage applied to the gate electrodes of each of the transistor switches 144 and 145 causes those switches to close, thus coupling the X channel signal to output lead 147 and the Y channel signal to output lead 149.

Conversely, when the logic X > Y signal is low, transistors 131 and 133 both will be on; the collector voltage of transisotr 131 will be relatively more positive and that of transistor 133 relatively more negative, so switches 138 and 139 now will be closed and switches 144 and 145 open. Under these conditions the [Y] signal will be applied to output lead 147 and the [X] signal will appear on lead 149. In this way these elements serve as a reversing switch operated in response to the comparison of the relative magnitudes of the X and Y channel signals, to connect whichever is the larger of those two signals to lead 147 and to connect the other to lead 149. This invariant relationship of relative magnitudes of the [X] and [Y] signals as applied to leads 147 and 149 is for the purpose of facilitating operation of the X/Y ratioing circuit of FIG. 5 next to be described.

With reference then to that figure, there is shown the octant selector 31, BCD up-down counter 47, the XY ratio detector and A/D convertor 53, and positive level detector 55. As will be recalled, the sequence of operations resulting in the setting of the BCD up-down counters to the desired azimuthal angle involves first a quadrant selection on the basis of relative polarities of the X and Y channel signals, next an octant selection on the basis of the relative magnitudes of the [X] and [Y] signals, and finally a degrees-within-octant determination on the basis of a ratioing of the relative magnitudes of the [X] and [Y] signals.

The quadrant and octant selection steps are accomplished by the circuitry shown within block 31, the octant selector, having as its inputs the X, Y, $\overline{X}$ and $\overline{Y}$ signals from the X and Y channel polarity detectors, and the X > Y and $\overline{X > Y}$ logic signals which are supplied from the magnitude comparator 43. These X and Y polarity and relative magnitude signals are applied to a logic network designated generally by reference numeral 151 and comprising a plurality of logic AND elements connected as shown to provide an octant preset input to the units and tens counter elements 153 and 155 of the BCD up-down counter 47 in accordance with the truth table of FIG. 6 as will be more fully explained hereinafter. The X > Y and $\overline{X > Y}$ inputs also are applied to this logic network 151 in the arrangement shown to provide an octant preset input to the counters 153 and 155, again in accordance with the truth table of FIG. 6. As further indicated by the truth table, logic network 151 serves also to preset the direction of count of the counters 153 and 155 upon input of serial data on lead 157 from the X/Y ratio detector 53, i.e., the degrees data by which the angle within the preselected octant is entered into the counters. Readout of the preset signals is controlled by a PARALLEL LOAD input on lead 159 derived as will later be explained.

Ratioing of the [X] and [Y] signal amplitudes is accomplished by detector 53, to which the X and Y absolute value signals are inputted on leads 147 and 149 from the reversing switch 51 of FIG. 4. It will be recalled that the greater of the [X] and [Y] signals always is impressed on lead 147 and the smaller always on lead 149 as indicated. The smaller signal on lead 147 is applied directly to one of the two inputs of each of a band of nine dual-sided operational amplifiers 171-179; lead 147 applied its larger signal to the other input to each of these amplifiers through an associated resistance divider network the resistance values in each of which are stepped so as to couple to each of the amplifiers 171-179 a different fraction of the input voltage ranging from approximately one-ninth of the input voltage up to nearly its full value.

Each of the amplifiers 171-179 will output a high signal when its input through the associated divider network equals or exceeds in magnitude the signal directly applied to its other input. Thus these amplifiers serve as threshold detectors having progressively stepped threshold values at which they fire, and the number of detectors which will fire in response to any given pair of inputted XY signals constitutes a direct measure of the numberical value of the ratio of thos signals. Such ratio in turn constitutes a direct measure of the tangent of the azimuthal angle of the signal source within the octant. The value of this tangent, which will vary from zero to one across the octant, is outputted into a nine-stage shift register 191 for conversion to serial data form for subsequent application to the up-down counters.

With a bank of nine voltage dividers and operational amplifiers as shown, the 45° of each octant would be divided into nine increments of 5° each, so that the angle readout would provide a resolution of 5°. The subsequent processing of this angle data can be simplified by avoiding the ratios corresponding to angles of 0° and 45°, and instead using 2.5° and 42.5° as the lower and upper extreme values and stepping in 5° increments therebetween. Thus the ratio of the two resistances of the divider network across which the input to the amplifier is taken is made numerically equal to the tangent of the angle 2.5° for amplifier 171, the angle 7.5° for amplifier 172, and so on in 5° steps up to 42.5° for amplifier 179.

As will be appreciated, the 5° resolution which the nine-stage ratio detector shown provides may be improved if desired simply by increasing the number of amplifier and shift register stages, further dividing the 45° of the octant to achieve as fine resolution as may be needed. It will also be appreciated that if preferred, the individual resistance divider networks 181-189 could be replaced with a single divider with taps corresponding to the desired fractions of the input voltage, though in practice the greater flexibility offered by the individual divider arrangement shown has been found often preferable.

The timing and sequencing of operations of the digital comparator and counters is controlled by positive level detector 55 which has as its inputs the X and Y signals on leads 147 and 149. These signals are transmitted through summing resistors 193 and 195 so as to apply their mean value to one of the two inputs of a dual-sided operational amplifier 197 having applied to its other input a reference voltage of fixed value, corresponding to the threshold signal level at which the ratio detection operation is to be begun. When this threshold is exceeded the amplifier will turn on, driving its output low and applying such output to one of the inputs of an inverted OR gate 201.

One of the other two inputs to this OR gate 201 is Time Pulse No. 3. This time pulse serves to trigger the ratio detection and readout operations in the event the positive level detector threshold value should for any reason not have been attained when such time period has lapsed. Any possible hangup in system operation which might otherwise result is thus avoided, and completion of readout is assured once an operating cycle is begun. Time Pulse No. 3 preferably is set to occur at or near the second half-cycle peak, though it may if desired be set to occur at any other time during the second half-cycle at which the signals in the two channels are above the noise.

The third input of OR gate 201 is from the "0" terminal of a flip-flop 203 having a CLEAR signal as a low input to its "reset"terminal. This CLEAR signal input goes high coincidentally with Time Pulse No. 2, at which time flip-flop 203 is caused to set its output on lead 205 to a "1" and its output on lead 207 to a "0". The flip-flop then remains in this state until after application of a signal to its "set"input. It will be appreciated that initially, while the CLEAR signal input is low, flip-flop 203 may output a "0" on lead 204 to gate 201 and that this may result in an output therethrough, but such output is to an AND gate 209 the other input to which is the CLEAR signal. There accordingly is no output from this second gate 209 until the CLEAR signal goes high.

When the output of threshold detector amplifier 197 goes low, or when Time Pulse No. 3 is received if that occurs first, such input to the inverted OR gate 201 will be passed to AND gate 209 and, since the other input to AND gate 209 is the CLEAR signal which now will be high, the gate will output on lead 211 a signal which is applied to the shift register 191 as a MODE CONTROL signal and the the up-down counters 153 and 155 as a PARALLEL LOAD signal. At the same time, this signal is applied to the "set" input of flip-flop 203 which then outputs a "1" on its lead 207 to the "enable" circuit 57. This starts the clock 59, producing a clock input to shift register 191 and to an AND gate 213 through which the shift register output serial data is transmitted through the octant selector to the up-down counters. Flip-flop 203 outputs a "0" on lead 205 to the OR gate 201 to provide a continuing output therethrough which is transmitted through AND gate 209 back to the "set" input of the flip-flop, latching it in this state until completion of the readout operation as signalled by termination of the CLEAR pulse.

Thus when the ratio detection and readout operation is triggered either by threshold detector amplifier 197 or by Time Pulse No. 3, the MODE CONTROL signal on lead 211 to the shift register 191 will enable the entry therein of the arc tangent angle data generated by the XY ratio detector. At the same time this signal as applied to the BCD up-down counters 153 and 155 will enable the parallel load therein of the quadrant and octant data derived by the octant selector 31 from its X, Y, $\bar{X}$, $\bar{Y}$, X >Y and $\overline{X>Y}$ inputs, thus presetting the counters to counts representing the octant angle preselected in accordance with the truth table of FIG. 6. This signal on lead 211 also trips flip-flop 203 and the resulting "one" signal on lead 207 starts clock 59 to shift the arc tangent angle data out of the shift register 191 through AND gate 213 to octant selector 31. As flip-flop 203 reverses state, the "0" then applied to inverted OR gate 201 provides a continuing output on lead 211 for the duration of the CLEAR pulse input thus affording adequate time for completion of readout.

The serial data output from shift register 191 is applied to one or the other of the "up" and "down" count inputs of the BCD counters in accordance with the direction of count derived as indicated in the truth table of FIG. 6 from the X, Y, $\bar{X}$, $\bar{Y}$, X >Y and $\overline{X>Y}$ inputs to octant selector 31. As the "units" counter 153 counts up any "carry" count is applied to the "tens" counter 155, and on count down any "borrow" count is applied to the "units" counter 153 in conventional fashion.

As an example of the operation for presetting the BCD up-down counters, if it is assumed that the variables X, Y, and X >Y all are logic "ones" corresponding to a source azimuthal angle of 45° to 90°, logic network 151 is structured to apply a logic "1" to inputs A'' of the tens counter and D' of the units counter, and a logic "0" to all other inputs. The counter thus is preset to a BCD representation of 90°. Gate 221 is an AND gate and since its inputs X and X >Y are logic "1" it will output a "1" to the D' input of units counter 153. Gate 223 is an inverted OR gate and, in response to its $\overline{X>Y}$ input which is a logic "0", will output a logic "1" to the A'' input of tens counter 155.

As indicated by the truth table, the direction of count for an azimuth angle in the octant between 45°and 90°is down, the down count beginning from the preset value of 90°. Since in this example X >0, Y>0 and X>Y, these inputs all are logic "1" and the AND function of the four gates 225–228 preceding gate 229 is not met, so its output will be a logic "0". This signal is inverted at its input to gate 231 and enables that gate. Clock pulses are then fed through the gate to the COUNT DOWN input of the units counter 153. Since the output of gate 229 is low and the AND function of gate 233 is inhibited and no clock pulses are fed to the COUNT UP input of the counter.

The other seven possible settings of the BCD up-down counters can be traced through the logic network 151 as in the previous example by following the truth table. The BCD up-down counters form functionally an arithmetic unit and the usual mechanisms for performing addition and subtraction are included. The arithmetic operation to be performed is controlled by the COUNT UP and DOWN inputs, and "borrow" and "carry" connections between the units counter and the "tens" counter 155 are provided in a conventional fashion. The BCD counter 155 are provided in a conventional fashion. The BCD counter data may be outputted to any appropriate recording or display device, and indicates directly the azimuthal angle of the source of the signal input to the system.

From the foregoing description of the invention it will be apparent that the ambiguity-free measure of azimuthal angle which the direction finder of the invention affords may by appropriate selection of the number of stages in the ratio detector and associated signal processing circuitry, provide a desired degree of resolution while still maintaining an ambiguity-free output. It will also be appreciated that the invention could be implemented entirely in analog form if this were preferred, and that many different forms of both analog and digital implementation present useful alternatives to the particular implementation shown.

Thus while in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. A direction finder for determining the azimuthal location of a source of wave energy incident upon the finder, comprising:
   a. first wave energy sensor means having a directional sensitivity pattern disposed along a first axis and providing a first directional signal of magnitude proportioned to the cosine of the angle between the energy source azimuth and said first axis;
   b. second wave energy sensor means having a directional sensitivity pattern disposed along a second axis orthogonally related to said first axis and providing a second directional signal of magnitude proportioned to the sine of the angle between the energy source azimuth and said first axis;
   c. means for detecting simultaneously the polarities of each of said first and second directional signals and for deriving from their polarities and indication of the quadrant in which said wave energy source is located;
   d. means for comparing the amplitudes of said first and second directional signals to determine which has the larger absolute value and for deriving from their relative values an indication of the octant within said quadrant in which said wave energy source is located;
   e. means for ratioing the magnitudes of said first and second directional signals and for deriving thereby an indication of the tangent of the angle within said octant at which said energy source is located; and
   f. means for combining the indications thus derived of said first and second directional signal polarities and relative amplitudes and the ratio of their magnitudes, to yield a measure of the azimuthal angle of said wave energy source.

2. A direction finder as defined in claim 1 further comprising third wave energy sensor means having an omnidirectional sensitivity pattern, and means responsive to the nondirectional signal provided thereby to control the sequence and timing of operation of said polarity detection means, amplitude comparison means and magnitude ratioing means for said first and second directional signals.

3. A direction finder as defined in claim 2 wherein said control means is responsive to said nondirectional signal when of one polarity and of level exceeding a first threshold value to initiate said polarity detection and amplitude comparison operations in sequence, and further including means responsive to signals of opposite polarity and of level exceeding a second threshold value to initiate said magnitude ratioing operation, whereby signal polarity detection and amplitude comparison are accomplished during one half-cycle of the nondirectional signal and magnitude ratioing is accomplished during the following half-cycle.

4. A direction finder as defined in claim 1 further comprising third wave energy sensor means having an omnidirectional sensitivity pattern, and means responsive to the nondirectional signal provided thereby to normalize said first and second directional signals equally and simultaneously.

5. A direction finder as defined in claim 4 wherein said signal normalization means comprises a like pair of switchable attenuators each controlling the signal level of one of said first and second directional signals, and electronic switching means responsive to amplitude of said nondirectional signal to control both said attenuators so that the first and second directional signals thus normalized each represent an identical fraction of the corresponding signal before normalization, and the larger of said first and second directional signals thus normalized remains within predetermined dynamic range limits.

6. A direction finder as defined in claim 1 wherein said means for combining said derived indications of signal polarities, relative amplitudes and ratio of magnitudes, comprise digital counter means, means responsive to said signal polarity and relative amplitude indications to preset into said counter means digital values representing the quadrant and octant in which said wave energy source is located and to determine the direction of count from such preset values to the azimuthal angle of said source, and means responsive to said magnitude ratio indication to cause said counter means to count in the direction thus determined and through a number of counts representing the azimuthal angle of said wave energy source within the octant thus preset.

7. A direction finder as defined in claim 1 further including reversing switch means through which said first and second directional signals are transmitted to said means for ratioing their magnitudes, and drive means for said switching means operative under control of said signal amplitude comparison means to apply said directional signals to said ratioing means in a manner such that the larger amplitude signal is ratioed into the smaller.

8. A direction finder for determining the azimuthal angle to a source of wave energy incident upon the finder, comprising:
   a. first and second wave energy sensor means each having a directional sensitivity pattern which is orthogonally related to that of the other and each providing a directional signal which together with that of the other is determinative of the location of the energy source azimuth as referenced to the respective directions of sensitivity of said sensors;
   b. third wave energy sensor means having an omnidirectional sensitivity pattern and providing a nondirectional signal;
   c. means responsive to said nondirectional signal to produce a series of timing signals sequenced in time;
   d. means enabled by a first of said timing signals for detecting simultaneously the polarities of each of said directional signals and for deriving from their relative polarities an indication of the quadrant in which said wave energy source is located;
   e. means enabled by a second of said timing signals for comparing the amplitudes of said directional signals to determine which has the larger absolute value and for selecting the octant within said quadrant in which said wave energy source is located;
   f. means enabled by a third of said timing signals for ratioing the magnitudes of said directional signals and for deriving thereby an indication of the angle between azimuth aximuth on which said energy source is located and one of the two azimuth on which said energy source together define said selected octant; and
   g. means for combining the indications thus derived of the relative polarities and amplitudes of said directional signals to identify said one azimuth and the direction therefrom of said energy source azimuth, and for adding thereto the angle indicated by ratioing means to yield a measure of the azimuthal angle to said wave energy source.

9. A direction finder as defined in claim 8 further comprising means responsive to said nondirectional signal to normalize both said directional signals simultaneously and equally.

10. A direction finder as defined in claim 8 further comprising means for sequencing said timing signals so that said polarity detection and amplitude comparison means are enabled thereby during one half-cycle of said nondirectional signal and said magnitude ratioing means are enabled thereby during the following half-cycle.

* * * * *